United States Patent [19]

Nishimura et al.

[11] Patent Number: 4,715,695
[45] Date of Patent: Dec. 29, 1987

[54] FIBER FOR OPTICAL TRANSMISSION

[75] Inventors: Masayuki Nishimura; Shuzo Suzuki; Hiroshi Yokoto, all of Kanagawa, Japan

[73] Assignee: Sumitomo Electric Industries, Ltd., Osaka, Japan

[21] Appl. No.: 599,023

[22] Filed: Apr. 11, 1984

[30] Foreign Application Priority Data

Jun. 15, 1983 [JP] Japan .................. 58-107354

[51] Int. Cl.⁴ ................................ G02B 6/16
[52] U.S. Cl. .......................... 350/96.31; 350/96.30
[58] Field of Search ............... 350/96.30, 96.31, 96.34

[56] References Cited

U.S. PATENT DOCUMENTS 4,149,772 4/1979 Iyengar et al. .............. 350/96.33
4,184,744 1/1980 Onoda et al. ............... 350/96.31 X
4,372,648 2/1983 Black ........................... 350/96.33

FOREIGN PATENT DOCUMENTS 1039095 9/1978 Canada ........................ 350/96.33
0050246 4/1977 Japan ........................... 350/96.33

Primary Examiner—William L. Sikes
Assistant Examiner—Akm E. Ullah
Attorney, Agent, or Firm—Sughrue, Mion, Zinn, Macpeak & Seas

[57] ABSTRACT

A fiber for optical transmission composed of a core having a substantially parabolic distribution of refractive index, a first cladding layer formed around the core having a refractive index equal to that of the periphery of the core and a thickness of 1/100 to 1/20 the diameter of the core, a second cladding layer formed around the first cladding layer having a refractive index smaller than that of the first cladding layer, and a third cladding layer formed around the second cladding layer having a refractive index greater than that of the second cladding layer. The fiber for optical transmission having such a structure has a broad bandwidth of transmitted light.

3 Claims, 8 Drawing Figures

FIBER FOR OPTICAL TRANSMISSION

BACKGROUND OF THE INVENTION

The present invention relates to a fiber for optical transmission and, more particularly, to an optical fiber having a structure which provides an improved transmission bandwidth region of transmitted light.

FIG. 1A and 1B show, respectively, a cross-sectional view of a conventional optical fiber and the distribution of the refractive index therein. In these Figures, reference numerals 1 and 2 indicate a core and a cladding, respectively, and n and $n_1$ represent the refractive indices of the core and the cladding, respectively. As shown in FIG. 1, the conventional optical fiber is composed of a core 1 having a nearly parabolic refractive index distribution and a cladding 2 having a constant refractive index $n_1$ equal to that of the periphery of the core 1. In the conventional optical fiber having such a structure, in order to obtain a broad transmission bandwidth for the transmitted light, it is considered necessary to precisely control the distribution of the refractive index of the core 1 to make it close to the most appropriate form, namely, the parabolic distribution. However, even if the optimum distribution form is attained, higher order modes traveling in the vicinity of the core-cladding boundary have a different propagation speed from the lower order modes traveling in the vicinity of the center of the core, which effect causes the transmission bandwidth to be reduced.

In order to solve the above-described problem, an improved optical fiber having a cross-sectional structure and a refractive index distribution as shown in FIG. 2A and 2B has been proposed. In FIG. 2, reference numerals 1, 2' and 3 indicate a core, a first cladding layer and a second cladding layer, respectively, and $n_2'$ and $n_1$ indicate the refractive index of the first cladding layer 1' and that of the second cladding layer 3, respectively. As shown in FIG. 2B, this improved optical fiber includes a core 1 having a refractive index distribution very close to a parabolic distribution, a first cladding layer 2' formed around the core 1 having a refractive index $n_2'$ smaller than that (n) of the periphery of the core, and a second cladding layer 3 formed around the first cladding layer 2' having a refractive index $n_1$. In this optical fiber, it has been considered that the higher order modes, which may cause a reduction of the transmissive bandwidth region, become leakage modes for which the transmission loss is high so that such modes are not substantially transmitted, and hence a broad transmission bandwidth can be obtained. However, in practice, it is difficult to obtain a broad transmission bandwidth since a part of the leakage modes are actually not sufficiently attenuated to provide the desired bandwidth characteristic.

SUMMARY OF THE INVENTION

Accordingly, an object of the present invention is to eliminate the disadvantages of the conventional optical fibers and to provide a fiber for optical transmission having a structure capable of providing a broad transmission bandwidth of transmitted light.

These objects of the present invention are accomplished by an optical fiber composed of a core and first through third concentric cladding layers of which the first cladding layer has a thickness in the range of from 1/100 to 1/20 the diameter of the core and a refractive index equal to that of the periphery of the core, and the second cladding layer has a refractive index smaller than that of the first and third cladding layers.

DESCRIPTION OF THE PREFERRED EMBODIMENTS

The present invention will now be described in further detail with reference to the accompanying drawings.

Figure 2A:
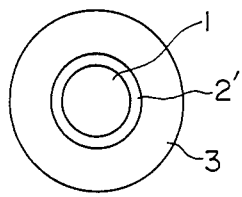
FIG. 2A is a cross-sectional view showing another example of a conventional optical transmission fiber.
Figure 2B:
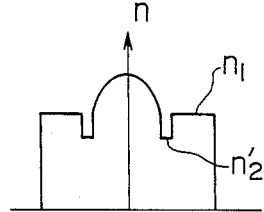
FIG. 2B is a graph showing the distribution of refractive index in the optical fiber of FIG. 2A.
Figure 3A:
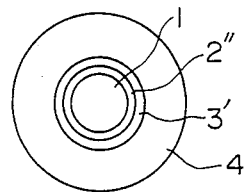
FIGS. 3A and 3B are, respectively, a cross-sectional view and a refractive index distribution of an optical fiber constructed in accordance with the present invention.
Figure 3B:
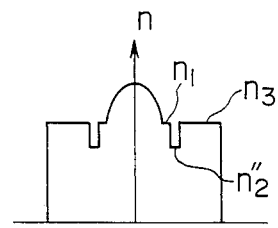

FIGS. 3A and 3B are, respectively, a cross-sectional view of a preferred embodiment of an optical fiber according to the present invention and a graph of the refractive index distribution of this fiber. In FIGS. 3A and 3B, 1, 2'', 3' and 4 indicate a core, a first cladding layer, a second cladding layer and a third cladding layer, respectively, and $n_1$, $n_2''$ and $n_3$ indicate the refractive indices of the first cladding layer 2'', the second cladding layer 3' and the third cladding layer 4, respectively. According to this embodiment, the propagation speeds of each mode, including the higher order modes and leakage modes, in the vicinity of the core-cladding boundary are made the same, thereby to obtain an extremely broad bandwidth transmission characteristic.

Figure 4:
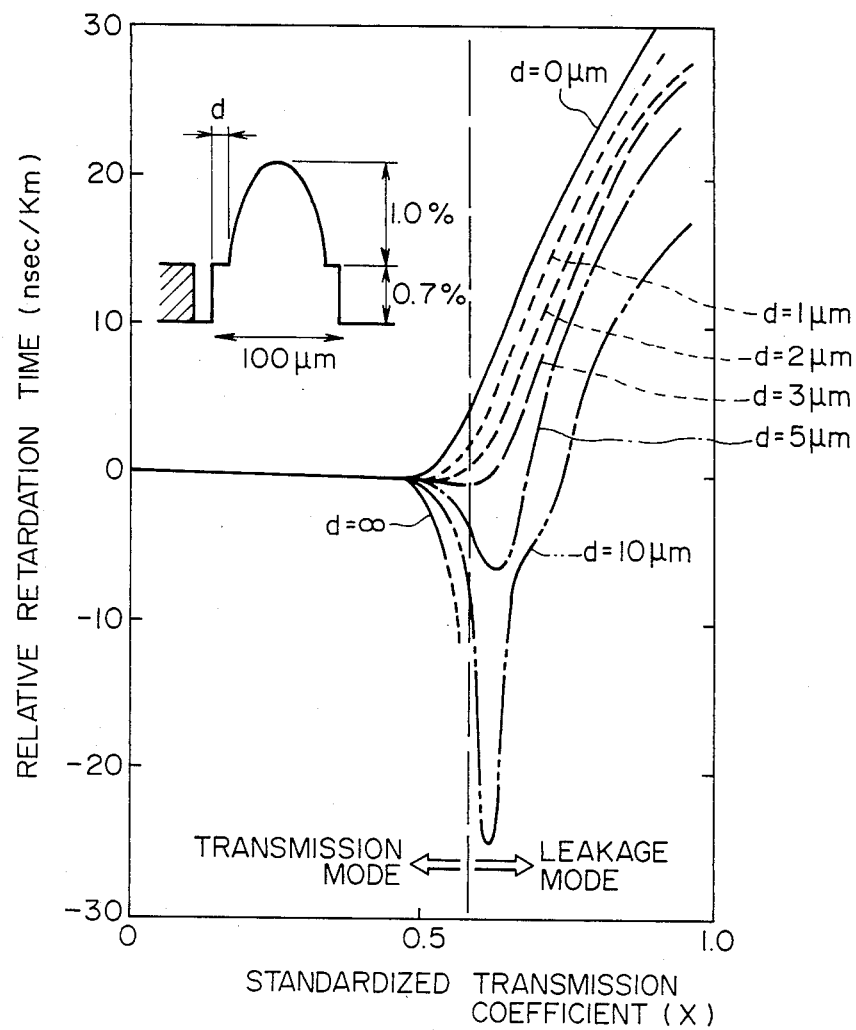
FIG. 4 is a graphical representation showing transmission characteristics of the optical transmission fiber according to the present invention as shown in FIGS. 3A and 3B.

FIG. 4 is a diagram showing calculated transmission characteristics of the optical fiber according to the present invention as shown in FIGS. 3A and 3B. On the abscissa is plotted a standardized transmission coefficient x, and on the ordinate a relative group retardation time of leakage and transmission modes. The standardized transmission coefficient is calculated from the following equation (see, for instance, Okoshi (ed.), *Hikari Fiber no Kiso*, 67, 1977):

$$X = \frac{k^2 n_c^2 - \beta^2}{k^2 n_c^2 - k^2 n_3^2},$$

where k represents the wave number of light in vacuo, $n_c$ the maximum refractive index of the core, and $\beta$ the transmission coefficient of each mode. The standardized transmission coefficient x corresponds to a position in the optical fiber in its radial direction. To obtain a broad wavelength region, it is sufficient for the group retardation times (differential transmission speeds) of all the modes to be the same in the transmission mode region and the connecting leakage mode region. It can be seen from FIG. 4 that a broad bandwidth can be obtained when the thickness (d) of the fist cladding layer 2" falls within a range of 1/100D<d<1/20D, wherein D represents the diameter of the core. In the present example, D is 100 μm and, accordingly, 1 μm<d<5 μm.

Figure 1A:
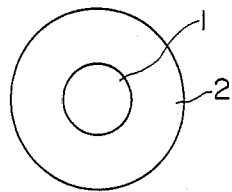
FIG. 1A is a cross-sectional view showing one example of a conventional optical transmission fiber.
Figure 1B:
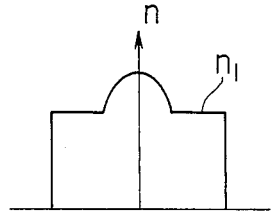
FIG. 1B is a graph showing the distribution of refractive index in the optical fiber of FIG. 1A.

The conventional optical fiber having a structure as shown in FIGS. 1A and 1B corresponds to the case where d=∞, while that of FIGS. 2A and 2B corresponds to the case where d=0. In these conventional cases, it is seen that the difference in the mode propagation speeds at the boundary of the core-cladding results in reduction in the bandwidth of the fibers.

Figure 5:
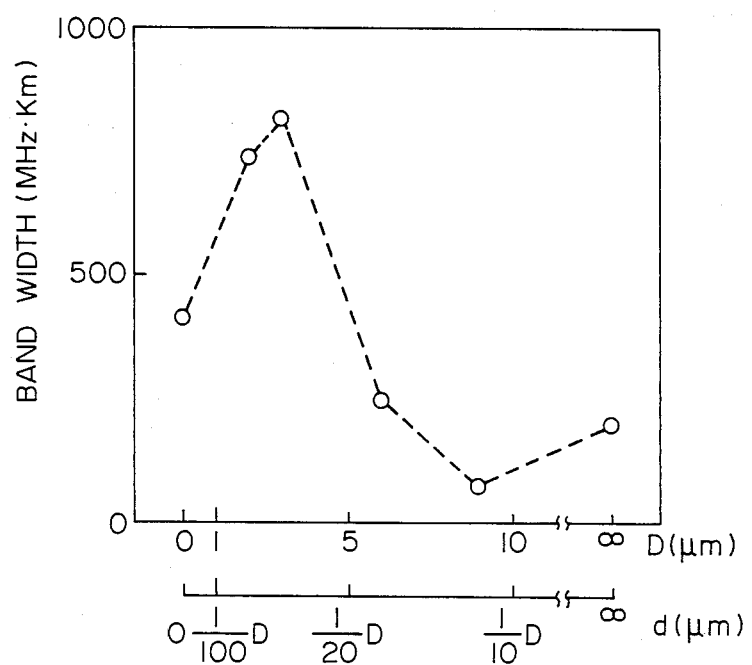
FIG. 5 is a graph showing the transmission bandwidth of various types of optical transmission fibers.

For the purpose of demonstrating the effects of the present invention, optical fiberss in accordance with the present invention and optical fibers in accordance with the prior art were prepared, and the relationship between the thinkness of a first cladding layer and the transmission bandwidth was determined. The results obtained are shown in FIG. 5. The fiber samples had a core diameter (d) of 100 μm, an outer diameter of 140 μm and a numerical aperture of 0.3. In the graph of FIG. 5, the cases of d=0 and d=∞ indicate the optical fibers according to the prior art. It is evident from the results shown in FIG. 5 that the optical fibers according to the present invention exhibit an extremely broad bandwidth of transmitted light.

While the invention has been described in detail with reference to specific embodiments thereof, it will be apparent to one skilled in the art that various changes and modifications can be made therein without departing from the spirit and scope of the invention.

We claim:

1. A fiber having only a single core for optical transmission, said core having a substantially parabolic distribution of refractive index for propagating light in a plurality of modes, said fiber further comprising: a first cladding layer formed around said core having a refractive index equal to that at a peripheral portion of said core, wherein the thickness of said first cladding layer is between D/100 and d/20, where D is the diameter of said core; a second cladding layer formed around said first cladding layer having a refractive index smaller than that of said first cladding layer; and a third cladding layer formed around said second cladding layer having a refractive index greater than that of said second cladding layer, wherein said core propagates all of said plurality of modes and said cladding layers affect retardation times of said plurality of modes propagating in said core.

2. An optical fiber as defined in claim 1, wherein the thickness of said second cladding layer is substantially less than that of said third cladding layer.

3. An optical fiber as defined in claim 1, wherein said refractive index of said third cladding layer is substantially the same as that of said second cladding layer.

* * * * *